J. W. STEVENSON.
FRUIT CONVEYER.
APPLICATION FILED AUG. 21, 1917.
1,283,949.
Patented Nov. 5, 1918.
3 SHEETS—SHEET 1.
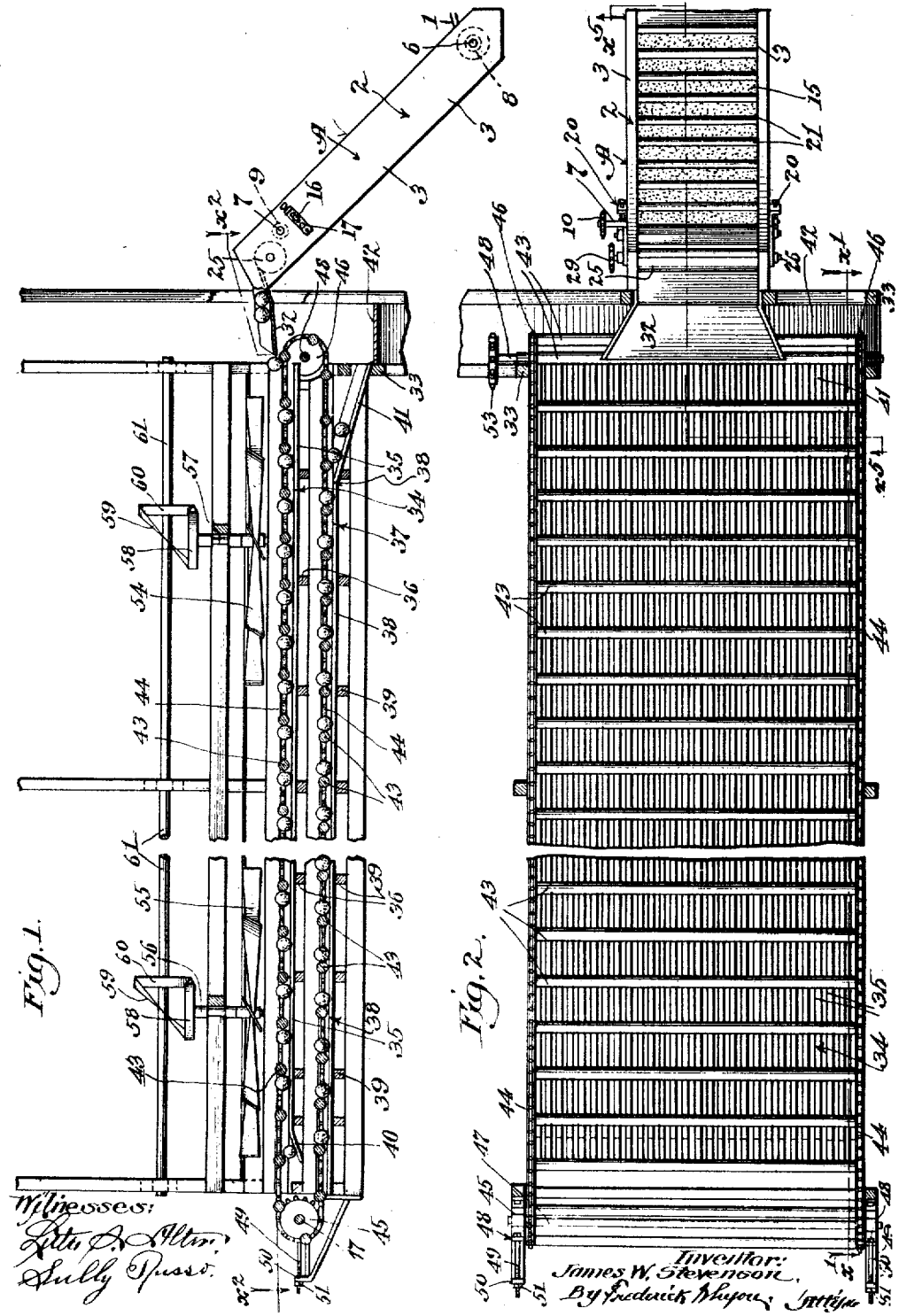

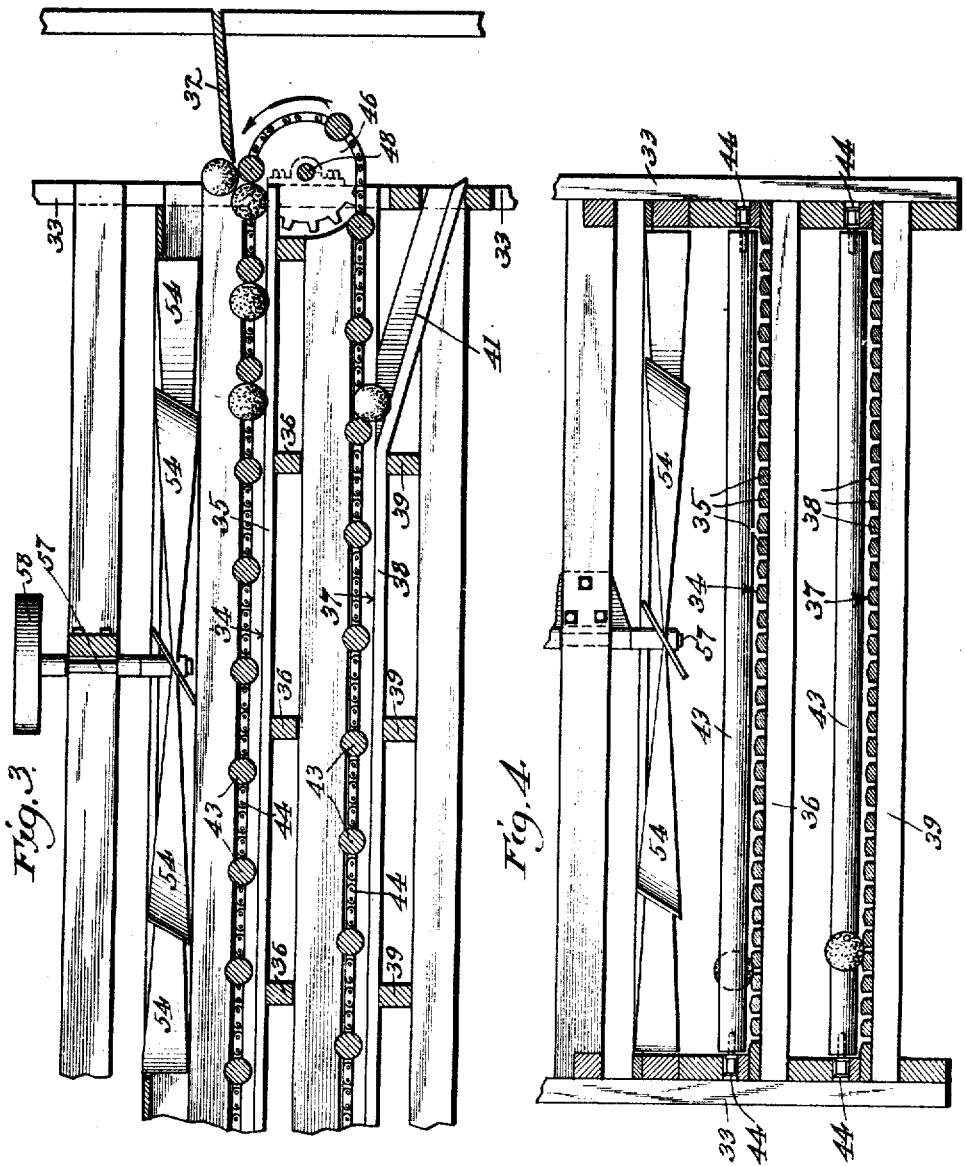

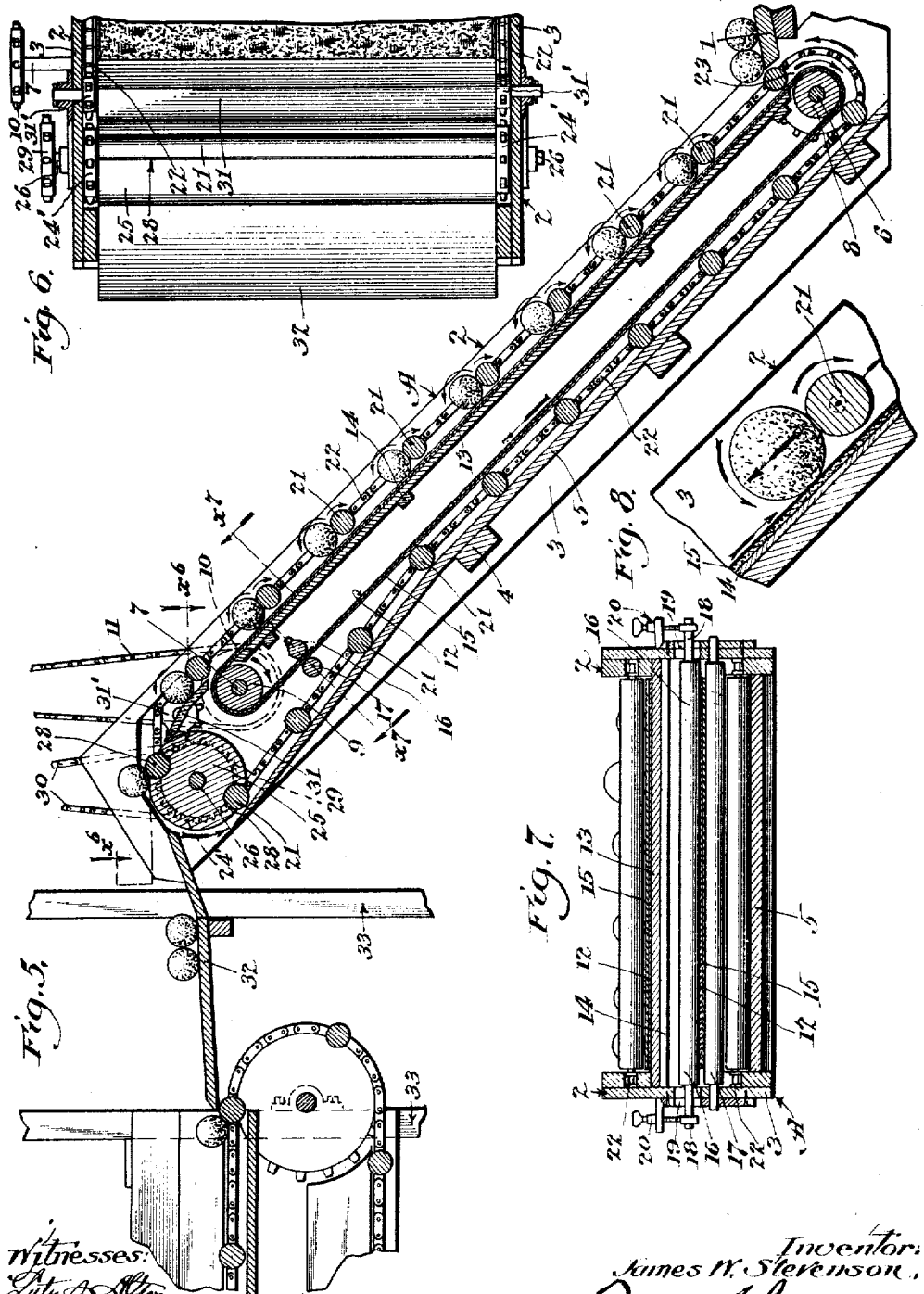

UNITED STATES PATENT OFFICE.

JAMES W. STEVENSON, OF RIVERSIDE, CALIFORNIA.

FRUIT-CONVEYER.

1,283,949.     Specification of Letters Patent.     Patented Nov. 5, 1918.

Application filed August 21, 1917. Serial No. 187,477.

*To all whom it may concern:*

Be it known that I, JAMES W. STEVENSON, a citizen of the United States, residing at Riverside, in the county of Riverside and State of California, have invented a new and useful Fruit-Conveyer, of which the following is a specification.

The principal objection to the majority of fruit handling apparatus such as conveying and elevating means for fruit, also drying means, and in fact, any apparatus wherein the fruit is moved or handled, is that the fruit is bruised or otherwise injured by excessive friction and jolting or jarring, the injured fruit being subject to rapid decay and often affecting uninjured fruit in contact therewith. Fruit of the citrus variety, particularly oranges and lemons, has skins or peels which contain a great number of oil cells that are easily ruptured by excessive friction often produced in conveying, elevating or otherwise handling the fruit with machines and when these oil cells are ruptured the fruit will deteriorate rapidly and decay.

This invention therefore relates to improvements in fruit handling apparatus and has for its principal object to overcome the above noted objections so that fruit may be handled without injury thereto.

The invention particularly relates to a means for conveying fruit which acts to dry the fruit while it is being conveyed.

One of the objects of the invention is to provide apparatus for conveying fruit in which friction, jolting or rough handling of fruit is minimized.

Another object of this invention is to provide fruit handling apparatus which is simple in construction, entirely automatic in operation and inexpensive to manufacture and operate.

The accompanying drawings illustrate the invention:

Figure 1 is a longitudinal sectional view taken on line $x^1$—$x^1$ of Fig. 2.

Fig. 2 is a horizontal sectional view taken on line $x^2$—$x^2$ of Fig. 1.

Fig. 3 is an enlarged fragmentary longitudinal sectional view of the drying apparatus.

Fig. 4 is a cross sectional view of the apparatus shown in Fig. 3.

Fig. 5 is an enlarged sectional view taken on line $x^5$—$x^5$ of Fig 2.

Fig. 6 is a sectional view taken on line $x^6$—$x^6$ of Fig. 5.

Fig. 7 is a cross sectional view taken on line $x^7$—$x^7$ of Fig. 5.

Fig. 8 is an enlarged fragmentary longitudinal sectional view showing the action of the conveying means and fruit when in operation.

With reference to the drawings, it will be seen that there is illustrated conveying means in the form of an elevator for carrying the fruit from the washing apparatus to the drying and conveying means, said elevating and the drying and conveying means acting to dry the fruit during its conveyance.

A designates an elevator conveyer which receives fruit from a slide or chute 1. The elevator conveyer A constitutes a box-like frame 2 comprising side members 3, transverse bars 4 secured to the members and connecting them near their lower edges and a floor board 5 mounted upon the bars 4 and secured at its edges to the members 3. This board 5 extends for a distance equal to approximately the entire length of the members 3 and it will be seen that the frame 2 is of trough-like construction.

Mounted transversely of the frame 2 at the ends thereof are shafts 6 and 7 carrying drums or rollers 8 and 9, the drum 8 being loose on the shaft 6 and the drum 9 fixed to the shaft 7. The shaft 7 carries a sprocket wheel 10, around which is rove a drive chain 11, the chain being driven from a suitable source of power not shown. These rollers or drums 8 and 9 operate the fruit supporting surface which is in the form of an endless belt 12. There is provided supporting means for the upper run of the endless belt 12 which constitutes a strip or board 13 supported by transverse bars 14 and secured to the members 3. This strip or board 13 lies between the rollers 8 and 9 and engages the belt 12 so as to support it against sagging under the weight of the fruit. The belt is preferably provided with a coating or layer 15 of absorptive material so that the water from the fruit will be readily absorbed.

There is provided a wringing means comprising opposed friction rollers 16 and 17 between which the fruit supporting surface constituting the belt 12 and layer 15 of absorptive material pass. These rollers are mounted near the roller 9 beneath the upper run of the endless fruit supporting surface. The pintles 18 of the upper roller 16 are vertically adjustably mounted in slots 19 formed in the side members 3 and there is provided a suitable means 20 such as shown in detail in Fig. 7 for regulating the degree of frictional engagement or wringing action of the rollers. The water wrung from the fruit supporting surface will flow downwardly over the floor 5 and escape at the lower end of the frame 2.

There is provided means for engaging and moving or impelling fruit along the fruit supporting surface or upper run of the belt 12 which consists of rollers 21 mounted transversely of the fruit supporting surface and rotatably secured at their ends to flexible elements or chains 22. These chains are rove around sprockets 23 carried on the shaft 6, and around sprockets 24' on the ends of a drum 25 which is fixed to a shaft 26 journaled in the upper end of the drum 2. The drum 25 is provided with notches 28 to receive said rollers. Mounted on the shaft 26 is a sprocket wheel 29 driven by a chain 30 which is operated from a suitable source of power not shown. The fruit supporting surface is adapted to travel in a clockwise direction as shown in Fig. 5 of the drawings, whereas the impelling means constituting the rollers 21 and chains 22 move in the opposite direction, the rollers 21 being spaced from the fruit supporting surface as shown in the drawings. It will be seen that as fruit rolls from off of the sliding or chute 1 onto the supporting surface constituting the belt 12 and the absorptive layer 15, it will be engaged by the rollers 21 and moved or conveyed upwardly over said surface. Since the fruit will be turned in a counter direction and since the fruit engages the rollers the rollers will be turned in a clockwise direction, therefore minimizing all friction. By elevating the fruit from the washing means the surplus water will more readily drain therefrom.

There is provided a bridge member 31 which is located between the drum 25 and upper end of the conveyer 12 with its upper surface substantially in line with the upper surface of the drum and conveyer in order that the fruit passing off of the conveyer may be carried over the bridge and onto the drum. Rotatably mounted opposite the ends of the bridge member 31 are idler sprockets 31' which are journaled in the side members 3 and mesh with the chains 22. Another bridge or runway 32 is mounted upon a part of the supporting structure or frame work 33 and has one end located adjacent to and below the upper surface of the drum 25 to receive the fruit from the drum and cause it to roll onto the other part of the conveyer drier apparatus which will be later more fully described, said runway 32 being inclined downwardly and outwardly from the drum.

There is provided a conveyer drier means for coöperating with the elevator conveyer drier, which comprises a fruit supporting surface generally designated 34 as an entirety and which is preferably positioned in a horizontal plane slightly below the upper end of the elevator conveyer. This surface comprises a series of equidistantly spaced longitudinal slats 35 mounted upon transverse supporting members 36. These members 36 constitute a part of the frame 33 for supporting the structure. A similar fruit supporting surface 37 comprising slats 38 and transverse supporting members 39, is positioned below the surface 34 in parallel relation thereto. The end of the surface 34 farthest removed from the elevator conveyer terminates short of the adjacent end of the surface 37 and is downwardly inclined as at 40 so as to allow fruit to roll off of the surface 34 onto the surface 37 and the end of the surface 37 adjacent to the elevator conveyer terminates short of the adjacent end of the surface 34 and communicates with a downwardly inclined chute or runway 41 which in turn communicates with a downwardly inclined discharge chute 42 down which the fruit passes after having been dried.

There is provided a means for engaging and impelling or moving the fruit over the surfaces 34 and 37 which constitutes an endless conveyer which is formed of a plurality of equidistantly spaced rollers 43 corresponding to the rollers 21 in the elevator conveyer. These rollers 43 are mounted transversely of the surfaces 34 and 37 and are rotatably secured to flexible elements or chains 44. These chains are rove around sprockets 45 and 46 which are fixed to shafts 47 and 48 located beyond the ends of the supporting surfaces 34 and 37. The supporting frame 33 is provided with suitable bearing means for supporting these shafts, the shaft 47 being provided with an adjustable bearing 48 operable through the medium of a screw 49 attached thereto and which is threaded through an arm or bracket 50. A nut 51 is turned on the screw 49 and by rotating this nut the bearing may be adjusted so as to take up or let out the chains. It will be seen that the rollers 43 are spaced from the fruit supporting surfaces 34 and 37, the upper run of the conveying means extending over the surface 34 and the lower run over the surface 37. Mounted on the shaft 48 is a sprocket 53 which is driven from a suitable source of power that serves to drive the chains 44 carrying the rollers 43.

Mounted over the upper run of the conveyer are drier fans 54 and 55 which direct air upon the fruit being moved over the surfaces 34 and 37. In this connection, it will be noted that by providing the latticed surfaces 34 and 37 the air will be forced through the surface 34 and onto the fruit on the surface 37. These latticed surfaces also permit a circulation of air about the fruit. The fans 54 and 55 are mounted upon vertical shafts 56 and 57, both shafts carrying horizontal pulleys 58 around which are rove belts 59. The belts 59 are driven by pulleys 60 fixed to a horizontal shaft 61 that may be operated by any suitable source of power not shown. Any number of these fans may be used dependent upon the size of the apparatus.

In operation, fruit after having been washed passes from the runway 1 onto the traveling fruit supporting surface constituting the belt 12, which is rotated in a clockwise direction. The elevating or impelling means is rotated in a counter-clockwise direction and the spaced rollers 21 engage and move the fruit along the supporting surface upwardly thereon. As shown in detail in Fig. 8 of the drawings, fruit will be rotated in a counter-clockwise direction owing to the fact that the supporting surface therefor is rotating in a clockwise direction, and such rotation of the fruit causes the rollers 21 to rotate in a clockwise direction. Therefore, since all of the fruit engaging surfaces are rotating, friction is minimized and possibility of injury due to bruising by fricton is eliminated. The fruit is allowed to feed onto the elevator conveyer slowly so that only one transverse line of fruit will engage the rollers 21. The excess water upon the fruit will become absorbed in the absorptive material 15 on the belt 12 and will also run down the inclined supporting surface and board 5. By turning the fruit all portions of the skins thereof come into contact with the absorptive surface and a thorough drying action is provided. The fruit is carried by the rollers 12 off of the traveling supporting surface therefor over the bridge member 31 and drum 25 onto the inclined runway 32, from thence it will roll onto the fruit supporting surface 34 which is preferably horizontal. The rollers 43 will engage the fruit on the surface 34 and convey said fruit along the surface beneath the fans 54 and 55. The surplus water has been removed from the fruit when the fruit is allowed to roll onto the surface 34 and the remaining moisture thereon will be dried through the action of the fans 54 and 55. The fruit passes over the inclined end 40 of the surface 34 onto the surface 37 beneath the surface 34 and is again engaged and carried along the surface 37 by the rollers 43, to the inclined runway 41 and from thence onto the chute 42. Fruit discharging through the chute 42 is suitably collected or stored as desired, or may be run onto a grader not shown. It will be seen that the fans 54 and 55 force air upon the fruit on both surfaces 34 and 37, and since said surfaces are of lattice work construction a quick drying action will be provided. The fruit will be guided over the surfaces 34 and 37 in straight lines in view of the lattice work construction of said surfaces, each piece of fruit lying in a space between the slats of the surfaces. In view of this construction, the pieces of fruit are not caused to come into contact with one another to such an extent that injury due to bruising will result, and since the rollers 43 are freely rotatable and will turn with the rotation of the fruit, friction and its resultant injury is eliminated.

With reference to the foregoing description and accompanying drawings, it will be seen that there is provided a fruit handling apparatus with which fruit may be elevated, conveyed and dried at the same time without any possibility of injuring the fruit, the most essential feature of the invention being the provision of a structure for practically eliminating friction in order that injury to the fruit from this cause will be prevented.

I claim:

1. In fruit handling apparatus, a traveling fruit supporting surface, and a traveling rotary fruit impelling means moving along the supporting surface, traveling of the impelling means causing rolling of the fruit and rolling of the fruit causing rotation of said means.

2. In fruit handling apparatus, a traveling fruit supporting surface, and a traveling rotary fruit impelling means moving over the supporting surface, traveling of the impelling means causing rolling of the fruit and rolling of the fruit causing rotation of said means.

3. A fruit handling apparatus, a traveling fruit supporting surface, and a traveling fruit impelling means moving along the supporting surface in a direction opposite to the direction of movement of the supporting surface.

4. In fruit handling apparatus, a traveling fruit supporting surface, and rotary traveling fruit engaging impelling means moving over the surface.

5. In fruit handling apparatus, a traveling fruit supporting surface, and rotary traveling fruit engaging impelling means moving over the surface in a direction opposite to the direction of movement of said surface.

6. In fruit handling apparatus, a traveling fruit supporting surface located in an upwardly inclined plane, and traveling rotary fruit impelling means moving along the surface, traveling of the impelling means causing rolling of the fruit and rolling of the fruit causing rotation of said means.

7. In fruit handling apparatus, a traveling fruit supporting surface located in an upwardly inclined plane, and traveling rotary fruit impelling means moving over the surface, traveling of the impelling means causing rolling of the fruit and rolling of the fruit causing rotation of said means.

8. In fruit handling apparatus, a traveling fruit supporting surface disposed in an upwardly inclined position, and rotary traveling fruit engaging and impelling means moving over the surface.

9. In fruit handling apparatus, a traveling fruit supporting surface disposed in an upwardly inclined position, and rotary traveling fruit engaging and impelling means moving over the surface in a direction opposite to the direction of movement of the surface.

10. In fruit handling apparatus, a traveling fruit supporting surface, and a number of traveling rotary impelling members spaced apart transversely of and over the surface, traveling of the impelling means causing rolling of the fruit and rolling of the fruit causing rotation of said means.

11. In fruit handling apparatus, a traveling fruit supporting surface, a number of traveling impelling members spaced apart transversely of and over the surface, and means to move said members in a direction opposite to the direction of movement of said surface.

12. In fruit handling apparatus, a traveling fruit supporting surface, and a number of rotary traveling impelling members spaced apart transversely of and over the surface.

13. In fruit handling apparatus, a traveling fruit supporting surface, a number of rotary traveling impelling members spaced apart transversely of and over the surface, and means to move said members in a direction opposite to the direction of movement of the surface.

14. In fruit handling apparatus, a traveling fruit supporting surface having absorptive qualities, and traveling fruit impelling means moving along the supporting surface.

15. In fruit handling apparatus, a fruit supporting surface having absorptive qualities, a plurality of spaced fruit engaging and impelling rollers mounted transversely of and over the surface, and means to move said rollers along the surface in contact with the fruit whereby the movement of the fruit causes rotation and drying thereof and rotation of the fruit causes rotation of the rollers.

16. In fruit handling apparatus, an inclined fruit supporting surface, fruit engaging and impelling rollers mounted transversely of and over the surface, and means to move said rollers along the surface in spaced relation thereto.

17. In fruit handling apparatus, the combination with a traveling fruit supporting surface, of a plurality of fruit engaging and impelling rollers mounted transversely of and over the surface in spaced relation thereto, and means to move said rollers along the surface.

18. In fruit handling apparatus, a fruit supporting surface having absorptive qualities, and freely rotatable means to engage and move fruit along the surface.

19. In fruit handling apparatus, a traveling fruit supporting surface, and freely rotatable means to engage and move fruit along the surface in a direction opposite to the direction of movement of the surface.

20. In fruit handling apparatus, an endless belt for supporting fruit, means to rotate the belt, an endless member operating around the belt, fruit impelling members on said endless member and extending across the upper run of the belt, and means to move the endless member in a direction opposite to the direction of movement of the belt.

21. In fruit handling apparatus, an endless belt for supporting fruit, means to rotate the belt, an endless member operating around the belt, fruit impelling rollers on said endless member and extending across the upper run of the belt, and means to move the endless member in a direction opposite to the direction of movement of the belt.

22. In fruit handling apparatus, an endless belt for supporting fruit, means to rotate the belt, an endless member operating around the belt, fruit impelling members on said endless member and extending across the upper run of the belt, means to move the endless member in a direction opposite to the direction of movement of the belt, and an absorptive surface on said belt.

23. In fruit handling apparatus, a frame, an endless fruit supporting belt mounted on the frame, means to rotate the belt, an endless member having one run located over the upper run of the belt, fruit engaging and impelling members carried by the endless member and extending above and across the belt, and means to rotate the endless member.

24. In fruit handling apparatus, a frame, an endless fruit supporting belt mounted on the frame, means to rotate the belt, an endless member having one run located over the upper run of the belt, fruit engaging and impelling rollers carried by the endless member and extending above and across the belt, and means to rotate the endless member.

25. In fruit handling apparatus, a traveling absorptive fruit supporting surface, wringing rolls between which said surface passes, and fruit engaging and impelling members moving over said surface in a direction opposite to the direction of movement of said surface.

26. In fruit handling apparatus, a fruit supporting surface, and a rotary traveling fruit impelling means moving over the supporting surface, traveling of the impelling means causing rolling of the fruit and rolling of the fruit causing rotation of said means.

Signed at Riverside, California, this 27th day of July, 1917.

JAMES W. STEVENSON.

Witnesses:
HARRY E. UMHEY,
JESS WRIGHT.